US010280367B2

(12) United States Patent
Pearson et al.

(10) Patent No.: US 10,280,367 B2
(45) Date of Patent: May 7, 2019

(54) ETCHING OF PLASTIC USING ACIDIC SOLUTIONS CONTAINING TRIVALENT MANGANESE

(71) Applicant: MacDermid Acumen, Inc., Waterbury, CT (US)

(72) Inventors: Trevor Pearson, Cradley Health West Midlands (GB); Craig Robinson, Coventry (GB)

( * ) Notice: Subject to any disclaimer, the term of this patent is extended or adjusted under 35 U.S.C. 154(b) by 789 days.

(21) Appl. No.: 14/467,105

(22) Filed: Aug. 25, 2014

(65) Prior Publication Data
US 2014/0360980 A1    Dec. 11, 2014

Related U.S. Application Data

(63) Continuation of application No. 13/356,004, filed on Jan. 23, 2012.

(51) Int. Cl.
| B44C 1/22 | (2006.01) |
| C03C 15/00 | (2006.01) |
| C03C 25/68 | (2006.01) |
| C23F 1/00 | (2006.01) |
| C09K 13/04 | (2006.01) |
| C25B 1/00 | (2006.01) |
| C08J 7/14 | (2006.01) |
| C25D 5/56 | (2006.01) |

(52) U.S. Cl.
CPC .............. C09K 13/04 (2013.01); C08J 7/14 (2013.01); C25B 1/00 (2013.01); *C08J 2355/02* (2013.01); *C25D 5/56* (2013.01)

(58) Field of Classification Search
USPC .......................................................... 216/83
See application file for complete search history.

(56) References Cited

U.S. PATENT DOCUMENTS

| 3,625,758 A | 12/1971 | Stahl et al. |
| 3,941,677 A | 3/1976 | Bourne |
| 4,042,729 A | 8/1977 | Polichette et al. |
| 4,279,705 A | 7/1981 | Riggs |
| 4,394,227 A | 7/1983 | Jager et al. |
| 4,544,450 A | 10/1985 | Oberrauch |
| 4,610,895 A | 9/1986 | Tubergen |
| 4,941,940 A | 7/1990 | Patel et al. |
| 4,948,630 A | 8/1990 | Courduvelis |
| 5,015,329 A | 5/1991 | Patel et al. |
| 5,049,230 A | 9/1991 | Patel |
| 5,160,600 A | 11/1992 | Patel et al. |
| 5,229,169 A | 7/1993 | Chao |
| 5,648,125 A | 7/1997 | Cane |
| 6,645,557 B2 | 11/2003 | Joshi |
| 6,861,097 B1 | 3/2005 | Goosey et al. |
| 2004/0074780 A1 | 4/2004 | Twardowski et al. |
| 2005/0199587 A1 | 9/2005 | Bengston |
| 2008/0193847 A1 | 8/2008 | Suetsugu et al. |
| 2009/0092757 A1 | 4/2009 | Satou et al. |
| 2011/0140035 A1 | 6/2011 | Schildmann et al. |
| 2011/0189590 A1 | 8/2011 | Guo |

FOREIGN PATENT DOCUMENTS

| EP | 0890566 | 1/1999 |
| WO | 2009023628 | 2/2009 |

*Primary Examiner* — Roberts P Culbert
(74) *Attorney, Agent, or Firm* — Carmody Torrance Sandak & Hennessey LLP

(57) ABSTRACT

A method of preparing a solution capable of etching a platable plastic. The method comprises the steps of: (a) providing an electrolyte comprising a solution of manganese (II) in a solution of 9 to 15 molar sulfuric acid or phosphoric acid to an electrolytic cell; (b) applying a current to the electrolytic cell, wherein the electrolytic cell comprises an anode and a cathode; and (c) oxidizing the electrolyte to form manganese(III) ions, wherein the manganese(III) ions form a metastable sulfate complex. Thereafter, a platable plastic may be immersed in the metastable sulfate complex for a period of time to etch the platable substrate prior to subsequent plating steps.

11 Claims, No Drawings

ETCHING OF PLASTIC USING ACIDIC SOLUTIONS CONTAINING TRIVALENT MANGANESE

CROSS REFERENCE TO RELATED APPLICATIONS

This application is a continuation of application Ser. No. 13/356,004, filed on Jan. 23, 2012, now pending, the subject matter of which is herein incorporated by reference in its entirety.

FIELD OF THE INVENTION

The present invention relates generally to methods of preparing plastics for subsequent plating thereon.

BACKGROUND OF THE INVENTION

It is well known in the art to plate non-conductive substrates, (i.e. plastics) with metal for a variety of purposes. Plastic moldings are relatively inexpensive to produce and metal plated plastic is used for many applications. For example, metal plated plastics are used for decoration and for the fabrication of electronic devices. An example of a decorative use includes automobile parts such as trim. Examples of electronic uses include printed circuits, wherein metal plated in a selective pattern comprises the conductors of the printed circuit board, and metal plated plastics used for EMI shielding. ABS resins are the most commonly plated plastics for decorative purposes while phenolic and epoxy resins are the most commonly plated plastics for the fabrication of printed circuit boards.

Preparing plastics for subsequent plating is a multi-step process and typical process steps include:
1) etching the substrate with a chromic acid etching solution;
2) neutralizing the etched surface with a chrome neutralizing solution;
3) activating the etched surface using a colloidal palladium tin activator;
4) removing tin with an accelerating step; and
5) depositing a layer of electroless copper or electroless nickel followed by electrolytic copper and/or nickel plating.

The initial etching of the plastic substrates is an essential part of the overall process, and essentially all commercial processes have utilized a chromic acid etch solution as a source of hexavalent chromium for the plastic etching step. This process has many attributes. Various plastics including ABS and ABS/polycarbonate blends can be plated with good plate appearance and adhesion. Immersion time and/or temperature in the chromic acid etch solution can be increased to plate more difficult plastics containing higher levels of polycarbonate or polypropylene. Extremely difficult plastics that are etch resistant, such as pure polycarbonate, can also be plated by incorporating a solvent prior to the chromium etching step.

Only certain types of plastic components are suitable for plating, and, as discussed above, the most common types of plastic for electroplating are acrylonitrile/butadiene/styrene (ABS) or a blend of this material with polycarbonate (ABS/PC). ABS consists of two phases. There is a relatively hard phase consisting of an acrylonitrile/styrene copolymer and a softer polybutadiene phase. Currently, this material is etched almost exclusively using a mixture of chromic and sulfuric acids. This oxidizing acid mixture is highly effective as an etchant for ABS and ABS/PC. The polybutadiene phase of the plastic contains double bonds in the polymer backbone and these are oxidized by the chromic acid thus causing complete breakdown and dissolution of the polybutadiene phase exposed at the surface of the plastic thus giving an effective etch to the surface of the plastic.

The purpose of the etching step is two fold. First, the plastic is etched to increase surface area. Secondly, the plastic is made hydrophilic, making the surface receptive to subsequent activating and plating stages. Typical chromic acid etching solutions are described, for example, in U.S. Pat. No. 4,610,895 to Tubergen et al., U.S. Pat. No. 6,645,557 to Joshi and U.S. Pat. No. 3,445,350 to Klinger et al., which are herein incorporated by reference in their entirety.

One problem with the traditional chromic acid etching step is that chromic acid is a recognized carcinogen and is increasingly regulated, insisting that wherever possible, the use of chromic acid is replaced with safer alternatives. The use of a chromic acid etchant also has well-known and serious drawbacks, including the toxicity of chromium compounds which makes their disposal difficult, chromic acid residues remaining on the polymer surface that inhibit electroless deposition, and the difficulty of rinsing chromic acid residues from the polymer surface following treatment. Additionally, hot hexavalent chromium sulfuric acid solutions are naturally hazardous to workers. Burns and upper respiratory bleeding are common in workers routinely involved with these chrome etch solutions. Thus, it is very desirable that safer alternatives to acidic chromium etching solutions be developed.

Permanganate solutions are described in U.S. Pat. No. 3,625,758 to Stahl et al., which is herein incorporated by reference in its entirety. Stahl suggests the suitability of either a chrome and sulfuric acid bath or a permanganate solution for preparing the surface.

U.S. Pat. No. 4,948,630 to Courduvelis et al., which is herein incorporated by reference in its entirety, describes a hot alkaline permanganate solution that also contains a material, such as sodium hypochlorite, that has an oxidation potential higher than the oxidation potential of the permanganate solution and is capable of oxidizing manganate ions to permanganate ions. U.S. Pat. No. 5,648,125 to Cane, which is herein incorporated by reference in its entirety, describes the use of an alkaline permanganate solution comprising potassium permanganate and sodium hydroxide, wherein the permanganate solution is maintained at an elevated temperature, i.e., between about 165° F. and 200° F. U.S. Pat. No. 4,042,729 to Polichette et al., which is herein incorporated by reference in its entirety describes an etching solution that comprises water, permanganate ion, and manganate ion, wherein the molar ratio of manganate ion to permanganate ion is controlled and the pH of the solution is maintained at 11-13.

U.S. Pat. No. 5,229,169 to Chao, which is herein incorporated by reference in its entirety, describes a process for depositing a metal layer on the surface of a polycarbonate-ABS resin (or other similar resin) comprising the steps of contacting the surface with an aqueous metal hydroxide solution, contacting the surface with an aqueous alkaline solution of a water-soluble permanganate, removing any residue of manganese compounds by contact with a reducing agent, and depositing an electroless metal layer on the surface. The alkaline permanganate generally comprises sodium or potassium permanganate and the reducing agent may comprise, for example, a solution of hydroxylamine salts.

However, attempts to use permanganate for etching plastics (other than epoxy base printed circuit boards) have not had much success. First, the surface treatment of the plastic is inconsistent, sometimes yielding good adhesion and sometimes yielding poor adhesion under identical treatment conditions. Second, permanganate solutions can be unstable, have a short life and are rapidly decomposed to manganese dioxide. Furthermore, as compared to chrome etchants, permanganate is less effective and not suitable for the wide range of plastic mixtures plated in general metal finishing operations.

None of these attempts to etch plastic using permanganate ions have been capable of producing etch characteristics which match those obtained by the use of chromic acid and the stability of the etching solutions is also poor, resulting in the formation of manganese dioxide sludge.

Other attempts to replace the chrome etching are also described in the prior art. For example, U.S. Pat. Nos. 4,941,940, 5,015,329, and 5,049,230, all to Patel et al., which are herein incorporated by reference in their entirety, describe a single or multi-step process for pre-swelling and etching of functionalized polymers, such as polycarbonates, using an etching solution that comprises at least one swelling agent and at least one degradation agent. The prepared substrates are then plated with electroless nickel or electroless copper.

U.S. Pat. No. 5,160,600 to Patel et al., which is herein incorporated by reference in its entirety, replaces the chromic acid etching solution with an etching solution that comprises sulfuric acid, and optionally phosphoric acid and/or nitric acid. The treated substrate is then immersed in an aqueous suspension of palladium.

Regardless of whether the oxidant solution is a hexavalent chromium solution or a permanganate solution, contact with the solution leaves an oxidant residue on the surface of the plastic part that acts to poison the catalytic surface, interfering with metal deposition and often resulting in void formation. A simple water rinse is generally inadequate to remove the residue and the art has thus resorted to a further step of contact with a solution of a reducing agent although more chemistry is involved in removal of oxidant residue than simple reduction. Removal of permanganate residue with a reducing agent is disclosed in above referenced U.S. Pat. No. 4,610,895 to Tubergen and U.S. Pat. No. 6,645,557 to Joshi.

As is readily seen, many etching solutions have been suggested as a replacement for chromic acid in processes for preparing non-conductive substrates for metallization. However, none of these processes have proven satisfactory for various economic, performance and/or environmental reasons and thus none of these processes have achieved commercial success or been accepted by the industry as a suitable replacement for chromic acid etching.

The tendency for permanganate based solutions to form sludge and undergo self-decomposition has been noted. Under strongly acidic conditions, permanganate ions can react with hydrogen ions to produce manganese (II) ions and water according to the following reaction:

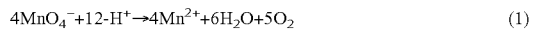
(1)

The manganese (II) ions formed by this reaction can then undergo further reaction with permanganate ions forming a sludge of manganese dioxide according to the following reaction:

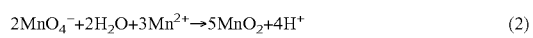
(2)

Thus formulations based on strongly acidic permanganate solutions are intrinsically unstable irrespective of whether the permanganate ion is added by alkali metal salts of permanganate or is electrochemically generated in situ. In comparison to the currently used chromic acid etches, the poor chemical stability of acidic permanganate renders it effectively useless for large scale commercial application. Alkaline permanganate etches are more stable, and are widely used in the printed circuit board industry for etching epoxy based printed circuit boards, but alkaline permanganate is not an effective etchant for plastics such as ABS or ABS/PC. Thus, manganese (VII) is unlikely to gain widespread commercial acceptance as an etchant for these materials.

Other attempts to etch ABS without the use of chromic acid have included the use of electrochemically generated silver (II) or cobalt (III). For many years, it has been known that certain metals can be anodically oxidized to oxidation states which are highly oxidizing. For example, manganese (II) can be oxidized to permanganate (manganese VI), cobalt can be oxidized from cobalt (II) to cobalt (III) and silver can be oxidized from silver (I) to silver (II).

There is currently no suitable commercially successful etchant for plastics based on either permanganate (in either acid or alkaline form), on manganese in any other oxidation state or by using other acids or oxidants.

Thus, there remains a need in the art for an improved etchant for preparing plastic substrates for subsequent electroplating that does not contain chromic acid and that is commercially acceptable.

SUMMARY OF THE INVENTION

It is an object of the invention to provide an etchant for plastic substrates that does not contain chromic acid.

It is another object of the present invention to an etchant for plastic substrates that is commercially acceptable.

It is still another object of the present invention to provide an etchant for plastic substrates that is based on manganese ions.

The present invention relates generally to a composition suitable for the etching of ABS, ABS/PC and other plastic materials and a method of using the same.

In one embodiment, the present invention relates generally to a method of preparing a solution capable of etching a plastic substrate, the method comprising the steps of:

providing an electrolyte comprising a solution of manganese(II) in a solution of 9 to 15 molar sulfuric acid or phosphoric acid to an electrolytic cell;

applying a current to the electrolytic cell, wherein the electrolytic cell comprises an anode and a cathode;

oxidizing the electrolyte to form manganese(III) ions, wherein the manganese(III) ions form a metastable sulfate complex; and treating the plastic substrate in the electrolyte.

In another embodiment, the present invention relates generally to an electrolyte capable of etching a plastic substrate, the electrolyte comprising a solution of manganese(III) in a solution of 9 to 15 molar sulfuric acid or phosphoric acid.

In one preferred embodiment, the electrolyte composition may be used to etch ABS or ABS/PC at a temperature of between 30 to 80° C.

DETAILED DESCRIPTION OF THE PREFERRED EMBODIMENTS

The inventors of the present invention have found that trivalent manganese can readily be produced by electrolysis at low current density of divalent manganese ions in strong sulfuric acid. More particularly, the inventors of the present invention have discovered that a solution of trivalent manganese ions in strongly acidic solution is capable of etching ABS.

Trivalent manganese is unstable and is highly oxidizing (standard redox potential of 1.51 versus normal hydrogen electrode). In solution, it very rapidly disproportionates to manganese dioxide and divalent manganese via the following reaction:

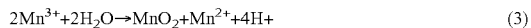

$$2Mn^{3+} + 2H_2O \rightarrow MnO_2 + Mn^{2+} + 4H+ \qquad (3)$$

However, in a strong sulfuric acid solution, the trivalent manganese ion becomes metastable and forms a cherry purple/red colored sulfate complex. The inventors have found that this sulfate complex is a suitable medium for the etching of ABS and has many advantages over chromium-free etches previously described.

In one embodiment, the present invention relates generally to a method of preparing a solution capable of etching a plastic substrate, the method comprising the steps of:

providing an electrolyte comprising manganese(II) ions in a solution of 9 to 15 molar sulfuric acid or phosphoric acid to an electrolytic cell;

applying a current to the electrolytic cell, wherein the electrolytic cell comprises an anode and a cathode;

oxidizing the electrolyte to form manganese(III) ions, wherein the manganese(III) ions form a metastable sulfate complex; and treating the plastic substrate with the electrolyte to etch the surface of the plastic substrate.

In a preferred embodiment, the plastic substrate comprises ABS or ABS/PC.

While it is contemplated that both phosphoric acid and sulfuric acid would work in compositions of the present invention, in a preferred embodiment, the acid is sulfuric acid. The stability of manganese (III) ions in sulfuric and phosphoric acids has been studied. At ambient temperatures, the half life of the manganese (III) ions in 7M sulfuric acid is on of the order of 2 years. By comparison, the half life of similar concentrations of manganese (III) ions in 7M phosphoric acid was around 12 days. It is suggested that the much higher stability of the manganese (III) ions in sulfuric acid is due to the formation of mangano-sulfate complexes and the higher concentration of available hydrogen ion concentration in the sulfuric acid solution. A further problem with the use of phosphoric acid is the limited solubility of manganese (III) phosphate. Thus, although other inorganic acids such as phosphoric acid can be usable in the compositions of the present invention, it is generally preferred to use sulfuric acid.

The remarkable stability of manganese (III) ions in strong sulfuric acid provides the following advantages in use:

1) Because the Mn(III) ions are formed at a low current density, the power requirements for the process are typically very low.
2) Because the anode operates at a very low current density, a small cathode in relationship to the anode area can be used to prevent cathodic reduction of the Mn(III) ions. This obviates the need for a divided cell and makes the engineering of an etchant regeneration cell simpler.
3) Because the process does not produce permanganate ions, there is no possibility of producing manganese heptoxide in the solution (this is a considerable safety hazard as it is violently explosive).
4) Because of the high stability of the Mn(III) ions in strong sulfuric acid, the etchant can be sold ready for use. In production, the etchant requires only a small regeneration cell at the side of the tank in order to maintain the Mn(III) content of the etch and prevent the build-up of Mn(II) ions.
5) Because other etch processes are based on permanganate, the result of the reaction of permanganate with Mn(II) ions causes rapid "sludging" with manganese dioxide and a very short lifetime of the etch. This should not be an issue with the Mn(III) based etch (although there may be some disproportionation over time).
6) The electrolytic production of Mn(III) in accordance with the present invention does not produce any toxic gases. Some hydrogen may be produced at the cathode, but owing to the low current requirements, this would be less than that produced by many plating processes.

As described herein, in a preferred embodiment the acid is sulfuric acid. The concentration of sulfuric acid may be between about 9 and about 15 molar. The concentration of sulfuric acid is important in the process. Below a concentration of about 9 molar, the rate of etch becomes too slow to be of use and above about 14 molar, the solubility of manganese ions in the solution becomes too low to get a useful concentration of the manganese into solution. Additionally, very high concentrations of sulfuric acid tend to absorb moisture from the air and are hazardous to handle. Thus, in a preferred embodiment, the concentration of sulfuric acid is between about 12 and 13 molar. This concentration of sulfuric acid is dilute enough to allow the safe addition of water to the etch and strong enough to optimize the etch rate of the plastic. At this concentration of sulfuric acid, up to around 0.08M of manganese sulfate can be dissolved at the preferred operating temperature of the etch. For optimal etching, the concentration of manganese ions in solution should be as high as it is feasible to achieve.

The manganese(II) ions are preferably selected from the group consisting of manganese sulfate, manganese carbonate and manganese hydroxide although other similar sources of manganese(II) ions known in the art would also be usable in the practice of the invention. The concentration of manganese(II) ions may be in the range of between about 0.005 molar and saturation. In one embodiment, the electrolyte also comprises colloidal manganese dioxide. This may form to some extent as a natural result of disproportionation of manganese (III) in solution, or may be added deliberately. Methods of preparing colloidal manganese dioxide are well known in the art.

Manganese (III) ions can be conveniently generated by electrochemical means by the oxidation of manganese (II) ions. The methodology for efficient production of trivalent manganese ions was determined and it was found that with the use of a platinum or platinized titanium anode, manganese (II) could be efficiently oxidized to manganese (III) at a current density of between 0.1 and 0.4 A/dm². At these current densities, the inventors of the present invention have found that the conversion efficiency of manganese (II) under these circumstances approaches 100%. Furthermore, at a current density of between 0.1 and 0.4 A/dm² using a platinized titanium anode, the anode potential is below the oxygen discharge potential and manganese (III) ions are produced with high efficiency. The inventors have found that etching of ABS can be achieved by this method.

The electrodes may comprise a material selected from the group consisting of platinum, platinized titanium, iridium oxide coated titanium, niobium and other suitable materials.

The cathode may also be made of platinum, platinized titanium, niobium, iridium oxide coated titanium or any other suitable material and is preferably platinum or platinized titanium. The anode may be made of platinized titanium, platinum, iridium/tantalum oxide, niobium, or any other suitable material and is preferably platinum or platinized titanium. For efficient generation of manganese (III) ions, it is generally necessary to use an anode area which is large in comparison to the area of the cathode. Preferably, the area ratio of anode to cathode is at least about 10:1. By this means, the cathode can be immersed directly in the electrolyte and it is not necessary to have a divided cell (although the process would work with a divided cell arrangement, this would introduce unnecessary complexity and expense).

In addition, it is generally preferable that the electrolyte not contain any permanganate ions.

In another embodiment the present invention comprises immersing the platable plastic in the metastable sulfate complex for a period of time to etch the surface of the platable plastic. In one embodiment, the platable plastic is immersed in the solution at a temperature of between 30 and 80° C. The rate of etching increases with temperature and is very slow below 50° C. The upper limit of temperature is determined by the nature of the plastic being etched. ABS begins to distort above 70° C., thus in a preferred embodiment the temperature of the electrolyte is maintained between about 50 and about 70° C., especially when etching ABS materials. The time period of the immersion of the plastic in the electrolyte is preferably between about 20 to about 30 minutes.

Articles etched in this manner may be subsequently electroplated using conventional pretreatment for plated plastics or the etched surface of the plastic could be used to enhance the adhesion of paint, lacquers or other surface coatings.

As described in the examples that follow, the inventors of the present invention have determined by means of cyclic voltammetry that at the concentration of manganese (II) ions used in the etch of this invention, the oxidation is diffusion controlled so efficient agitation of the etch solution is necessary during the electrolytic oxidation process.

In another embodiment, the present invention relates generally to an electrolyte capable of etching a platable plastic, the electrolyte comprising a solution of manganese (II) in a solution of 9 to 15 molar sulfuric acid or phosphoric acid. The electrolyte oxidizes to form manganese(III) ions, wherein the manganese(III) ions form a metastable sulfate complex where sulfuric acid is used.

The invention will now be illustrated with the following non-limiting examples.

Comparative Example I

A solution of 0.08 molar of manganese sulfate in 12.5 molar sulfuric acid (500 ml) was heated to 70° C. and a piece of platable grade ABS was immersed in the solution. Even after an hour immersed in this solution, there was no discernible etching of the test panel and upon rinsing, the surface was not "wetted" and would not support an unbroken film of water.

Example 1

The solution of Comparative Example 1 was electrolyzed by immersing a platinized titanium anode of an area of 1 $dm^2$ and a platinized titanium cathode of surface area 0.01 $dm^2$ in the solution and applying a current of 200 mA for 5 hours.

During this period of electrolysis, the solution was observed to change in color from almost colorless to a very deep purple/red color. It was confirmed that no permanganate ions were present.

This solution was then heated to 70° C. and a piece of platable grade ABS was immersed in the solution. After 10 minutes of immersion, the test piece was fully wetted and would support an unbroken film of water after rinsing. After 20 minutes of immersion, the sample was rinsed in water, dried and examined using a scanning electron microscope (SEM). This examination revealed that the test piece was substantially etched and many etch pits were visible.

Example 2

A test piece of platable grade ABS was etched in a solution prepared as in Example 1 for 30 minutes at 70° C. The sample was then rinsed and plated using the following pretreatment sequence:
  1) Treatment in a proprietary preparation for plating on plastic (M-neutralize, available from MacDermid, Inc)
  2) Rinse
  3) Pre-dip in 30% hydrochloric acid
  4) Activate in a proprietary palladium colloid activator (D34 C, available from MacDermid, Inc.)
  5) Rinse
  6) Accelerate in a proprietary preparation (Macuplex Ultracel 9369, available from MacDermid, Inc.)
  7) Rinse
  8) Plate in electroless nickel process (Macuplex J64, available from MacDermid, Inc.)
  9) Rinse
  10) Plate in acid copper process to a thickness of 30 microns (CuMac Optima, available from MacDermid)
In all cases, the process parameters were as recommended on the technical data sheet for each product.

After the copper plating process was completed, the sample was dried and examined. The copper deposit was bright and clear with no evidence of blistering and showed good adhesion of the deposit to the substrate.

Example 3

A solution containing 12.5 M of sulfuric acid and 0.08 M manganese (II) sulfate was electrolyzed using a platinized titanium anode at a current density of 0.2 $A/dm^2$. A platinized titanium cathode having an area of less than 1% of the anode area was used in order to prevent cathodic reduction of the Mn(III) ions produced at the anode. The electrolysis was performed for long enough for sufficient coulombs to be passed to oxidize all of the manganese (II) ions to manganese (III). The resulting solution was a deep cherry purple/red color. There were no permanganate ions generated during this step. This was also confirmed by visible spectroscopy—the Mn(III) ions produced a completely different absorption spectrum from that of a solution of permanganate.

Example 4

The etching solution prepared as described above in Example 3 was heated to 65-70° C. on a magnetic stirrer/hotplate and test coupons of ABS were immersed in the solution for time periods of 20 and 30 minutes. Some of these test coupons were examined by SEM and some were processed in a normal plating on plastic pretreatment sequence (reduction in M-neutralize, predip, activate, accelerate, electroless nickel, copper plate to 25-30 microns). These test coupons were then annealed and subjected to peel strength testing using an Instron machine.

Peel strength testing carried out on coupons plated for 30 minutes demonstrated peel strength varying between about 1.5 and 4 N/cm.

Cyclic voltammograms were obtained from a solution containing 12.5M sulfuric acid and 0.08M manganese sulfate using a platinum rotating disk electrode (RDE) having a surface area of 0.196 cm$^2$ at various rotation speeds. A model 263A potentiostat and a silver/silver chloride reference electrode were used in conjunction with the RDE.

In all cases, the forward scan showed a peak at around 1.6V vs. Ag/AgCl followed by a plateau up to around 1.75V followed by and increase in current. The reverse scan produced a similar plateau (at a slightly lower current and a peak around 1.52V. The dependence of these results on the rate of electrode rotation indicates mass transport control is a primary factor in the mechanism. The plateau indicates the potential range over which Mn(III) ions are formed by electrochemical oxidation.

A potentiostatic scan was performed at 1.7V. It was observed that the current initially dropped and then over a period of time increased. The current density at this potential varied between 0.15 and 0.4 A/dm$^2$.

Following this experiment, a galvanostatic measurement was taken at a constant current density of 0.3 A/dm$^2$. Initially, the applied current density was achieved by a potential of about 1.5V but as the experiment progressed, after about 2400 seconds, and increase in potential to about 1.75V was observed.

The results of these experiments demonstrate that manganese (III) ions can be generated by electrosynthesis at low current densities using a platinum or platinized titanium anode.

After a period of etching for more than 10 minutes, it was observed that the surface of the ABS test coupons was fully wetted and would support an unbroken film of water after rinsing. After a period of 20 or 30 minutes, the panels were noticeably etched.

What is claimed is:

1. A method comprising:
   a. providing a substrate comprising one or more organic polymers;
   b. providing a composition comprising dissolved Mn(II) ions, dissolved Mn(III) ions, and one or more acids; and
   c. contacting the substrate comprising the one or more organic polymers with the composition to etch a surface of the substrate.

2. The method according to claim 1, wherein the concentration of Mn(II) ions in the composition is in the range of between about 0.005 molar and saturation.

3. The method according to claim 1, wherein a portion of the Mn(II) ions are oxidized to Mn(III) ions by electrolysis.

4. The method according to claim 1, wherein the temperature of the composition is in the range of between about 30° C. and about 80° C.

5. The method according to claim 1, wherein the substrate is contacted with the composition for about 20 to about 30 minutes.

6. The method according to claim 2, wherein the composition is agitated.

7. The method according to claim 1, wherein the one or more acids comprise sulfuric acid or phosphoric acid.

8. The method according to claim 7, wherein the one or more acids comprise sulfuric acid.

9. The method according to claim 8, wherein the concentration of the sulfuric acid is in the range of between about 9 and about 15 molar.

10. The method according to claim 9, wherein the concentration of the sulfuric acid is in the range of between about 12 and about 13 molar.

11. The method according to claim 9, wherein the composition further comprises colloidal manganese dioxide.

\* \* \* \* \*